(12) United States Patent
Lien et al.

(10) Patent No.: US 11,808,635 B2
(45) Date of Patent: Nov. 7, 2023

(54) SYSTEM FOR CONTINUOUSLY DETECTING TEMPERATURE AND COMPOSITION OF MOLTEN STEEL DURING CONVERTER STEELMAKING

(71) Applicants: Chu Lien, Shanghai (CN); Young Lian, Shanghai (CN)

(72) Inventors: Chu Lien, Shanghai (CN); Young Lian, Shanghai (CN)

(*) Notice: Subject to any disclaimer, the term of this patent is extended or adjusted under 35 U.S.C. 154(b) by 520 days.

(21) Appl. No.: 17/254,704

(22) PCT Filed: Apr. 29, 2019

(86) PCT No.: PCT/CN2019/084960
§ 371 (c)(1),
(2) Date: Dec. 21, 2020

(87) PCT Pub. No.: WO2020/220187
PCT Pub. Date: Nov. 5, 2020

(65) Prior Publication Data
US 2021/0116307 A1     Apr. 22, 2021

(51) Int. Cl.
*G01K 1/12*     (2006.01)
*C21C 5/46*     (2006.01)

(52) U.S. Cl.
CPC ............ *G01K 1/125* (2013.01); *C21C 5/4673* (2013.01)

(58) Field of Classification Search
CPC .......................... G01K 1/125; C21C 5/4673
USPC ........................................................ 374/140
See application file for complete search history.

(56) References Cited

U.S. PATENT DOCUMENTS

| 3,661,725 A * | 5/1972 | Ulrich ................ G01N 33/2025 75/382 |
| 4,377,347 A * | 3/1983 | Hanmyo ................ G01K 13/10 266/88 |

FOREIGN PATENT DOCUMENTS

| CH | 608615 A5 * | 8/1974 |
| CN | 200981874 | 11/2007 |
| CN | 201003060 | 1/2008 |
| CN | 101293753 | 10/2008 |
| CN | 202099314 | 1/2012 |
| CN | 103773920 | 5/2014 |

(Continued)

OTHER PUBLICATIONS

China National Intellectual Property Administration, "International Search Report" for PCT/CN2019/084960, dated Jan. 23, 2020, 8 pages.

*Primary Examiner* — Mirellys Jagan
(74) *Attorney, Agent, or Firm* — Kirk A. Wilson; Joseph T. Guy; Patent Filing Specialist Inc.

(57) ABSTRACT

The present disclosure provides a system for continuously detecting the temperature and composition of molten steel during converter steelmaking, and relates to the technical field of steelmaking detection devices. A seating brick (3) and a probe conveying pipe (5) are provided on a side wall of a converter (1), and multiple probes are provided in different detection through holes (4) within the probe conveying pipe (5) respectively. The temperature of molten steel, the oxygen activity of the molten steel and the low carbon and phosphorus content in the molten steel within the converter can be detected in real time. This facilitates an operator adopting corresponding operational means to reach the smelting end point in an optimized manner so as to improve various economic and technical indexes in steelmaking.

7 Claims, 7 Drawing Sheets

(56) References Cited

FOREIGN PATENT DOCUMENTS

| | | | | |
|---|---|---|---|---|
| CN | 203904385 | | 10/2014 | |
| CN | 106872371 | | 6/2017 | |
| CN | 108165700 | | 6/2018 | |
| CN | 109269646 | | 1/2019 | |
| CN | 210141943 U | * | 3/2020 | |
| FR | 1579374 A | * | 8/1969 | ............... C21C 5/46 |
| JP | 2003208687 | | 7/2003 | |
| KR | 20080032331 A | * | 4/2008 | |
| KR | 20090129275 A | * | 12/2009 | |
| KR | 20130073676 | | 7/2013 | |
| KR | 20150024641 A | * | 3/2015 | |

* cited by examiner

SYSTEM FOR CONTINUOUSLY DETECTING TEMPERATURE AND COMPOSITION OF MOLTEN STEEL DURING CONVERTER STEELMAKING

TECHNICAL FIELD

The present disclosure relates to the technical field of steelmaking detection devices, in particular to a system for continuously detecting the temperature and composition of molten steel during converter steelmaking.

BACKGROUND

At present, the main steelmaking equipment in China is the oxygen top-blown converter. During the blowing process, a few converters use a sub-lance system to detect the temperature and composition of the molten steel. That is, in the middle and late stages of blowing, a sub-lance probe is inserted into the molten steel from the mouth of the converter to take steel samples and detect the temperature, oxygen activity and carbon content of the molten steel. In recent years, a very small number of converters have adopted a throwing detection system, which puts a detection probe from the mouth of the converter to detect the temperature and oxygen activity of the molten steel only at the late stage of blowing. The vast majority of converters that do not use these two detection systems carry out temperature measurement and sampling at the mouth of the converter before tapping. However, most steel mills have already tapped the steel before the laboratory reports the composition of the steel sample.

In summary, the current detection system cannot meet the requirements of the steel-making operators for real-time and continuous molten steel temperature and composition.

Since the operator do not accurately know the real-time temperature and composition of the molten steel, the tapping temperature, low carbon content and slag volume are often excessive. This will lead to a decline in the economic and technical indexes of the converter, as well as quality and production accidents.

SUMMARY

In order to solve the above technical problems, the present disclosure provides a system for continuously detecting the temperature and composition of molten steel during converter steelmaking. The present disclosure can monitor the high carbon of molten steel and continuously monitor the temperature, oxygen activity, low carbon and phosphorus content of the molten steel during the blowing period of the converter.

To achieve the above objective, the present disclosure adopts the following solutions:

The present disclosure provides a system for continuously detecting the temperature and composition of molten steel during converter steelmaking. The detection system includes a seating brick, a probe conveying pipe and a detection probe, where the seating brick is provided on a side wall of a converter; a mounting hole is provided in the middle of the seating brick; the probe conveying pipe is provided in the mounting hole; the probe conveying pipe is provided therein with a detection through hole; the detection probe is provided in the detection through hole.

Optionally, both the seating brick and the probe conveying pipe may be made of a refractory material.

Optionally, the seating brick may be located 200 mm to 1,000 mm below a static liquid level of molten steel in the converter.

Optionally, multiple mounting holes may be provided on the probe conveying pipe.

Optionally, multiple detection probes may be provided in the mounting holes.

Optionally, one end of the detection probe may be provided with a convex wedge, and the other end thereof may be provided with a concave wedge; the convex wedge may match the concave wedge.

Optionally, the detection system may further include a pushing mechanism for pushing the detection probe into the converter along the detection through hole.

Optionally, the pushing mechanism may be an air cylinder or a hydraulic cylinder.

Optionally, a gas protection mechanism may be further provided on a side of the probe conveying pipe located outside the converter; the gas protection mechanism may be used to feed a protective gas into the detection through hole to prevent the molten steel from flowing out along the detection through hole.

Optionally, the detection probe may include a temperature probe, a carbon probe, an oxygen probe and a phosphorus probe.

Compared with the prior art, the present disclosure achieves the following technical effects:

The detection system of the present disclosure provides a seating brick and a probe conveying pipe on a side wall of the converter, and provides multiple probes in different detection through holes within the probe conveying pipe respectively. The present disclosure can detect the temperature, oxygen activity, low carbon and phosphorus content of the molten steel within the converter in real time. This facilitates an operator adopting corresponding operational means to reach the smelting end point in an optimized manner so as to improve various economic and technical indexes in steelmaking.

BRIEF DESCRIPTION OF DRAWINGS

In order to illustrate the technical solutions in the embodiments of the present disclosure or in the prior art, the accompanying drawings required in the embodiments are described briefly below. Apparently, the accompanying drawings described below merely illustrate some embodiments of the present disclosure, and those of ordinary skill in the art may still derive other accompanying drawings based on these described accompanying drawing without any creative efforts.

Figure 1:
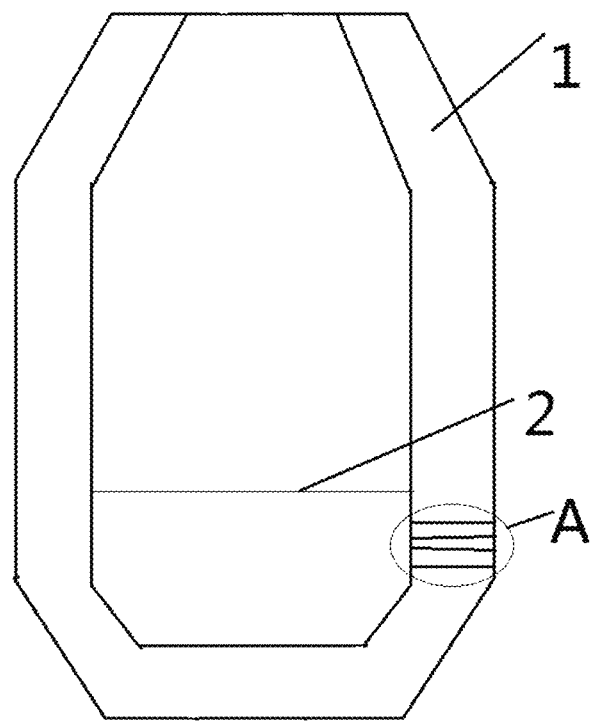
FIG. 1 is a structural diagram of a system for continuously detecting the temperature and composition of molten steel during converter steelmaking according to the present disclosure.
Figure 2:
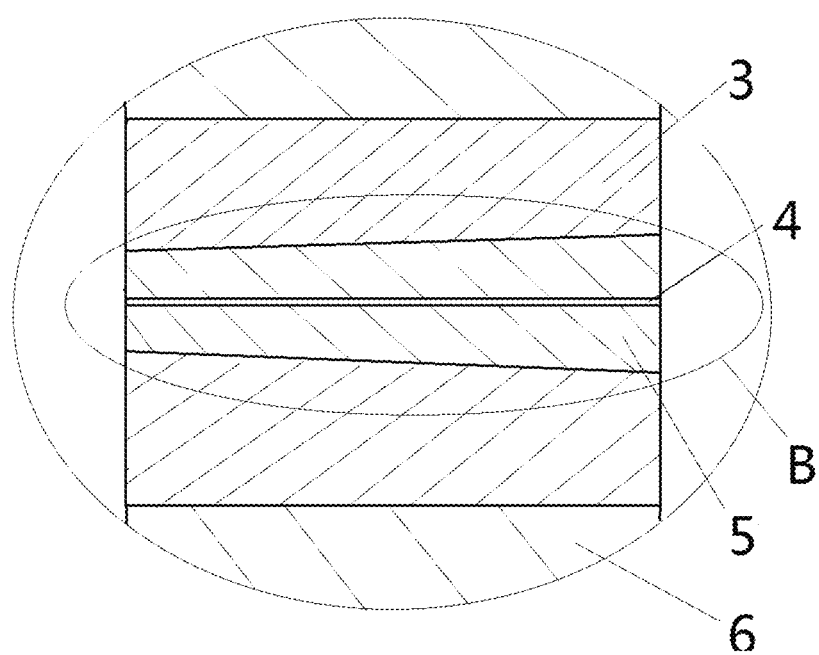
FIG. 2 is a detail drawing of A of the system for continuously detecting the temperature and composition of molten steel during converter steelmaking according to the present disclosure.
Figure 3:
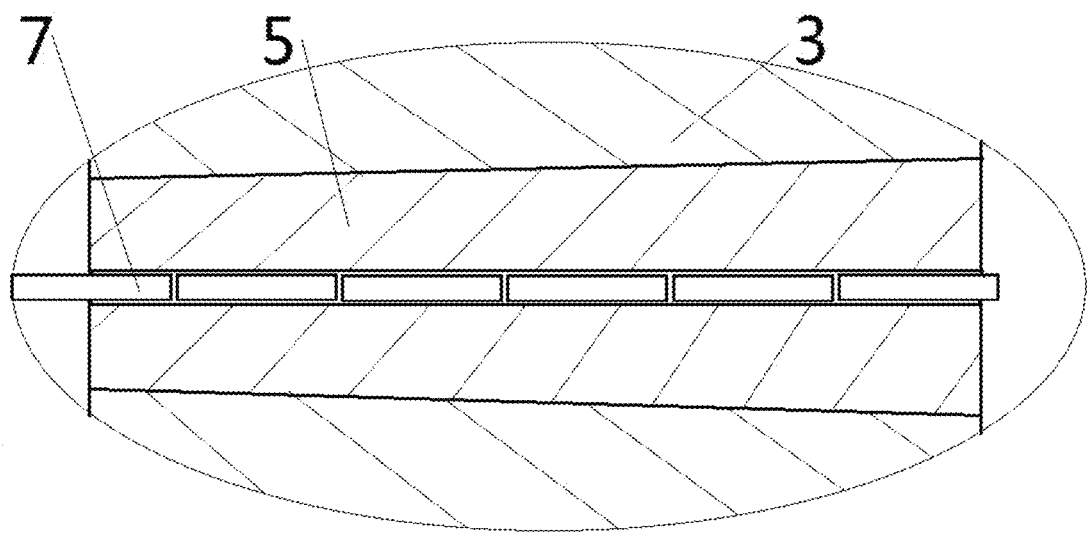
FIG. 3 is a detail drawing of B of the system for continuously detecting the temperature and composition of molten steel during converter steelmaking according to the present disclosure.
Figure 4:
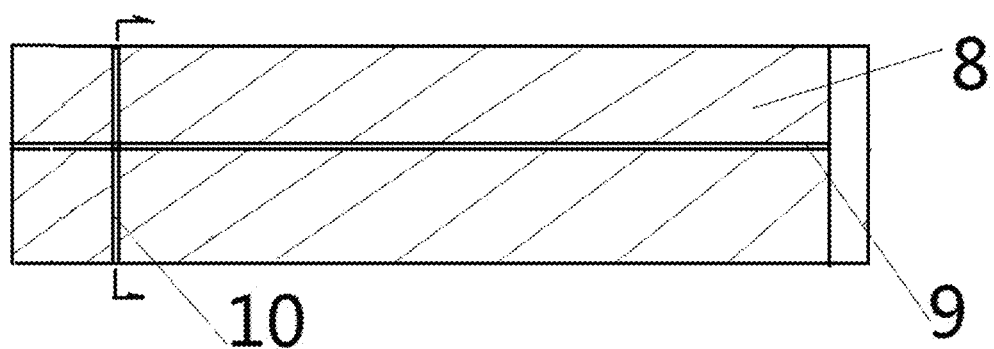
FIG. 4 is a structural diagram of a temperature probe in the system for continuously detecting the temperature and composition of molten steel during converter steelmaking according to the present disclosure.
Figure 5:
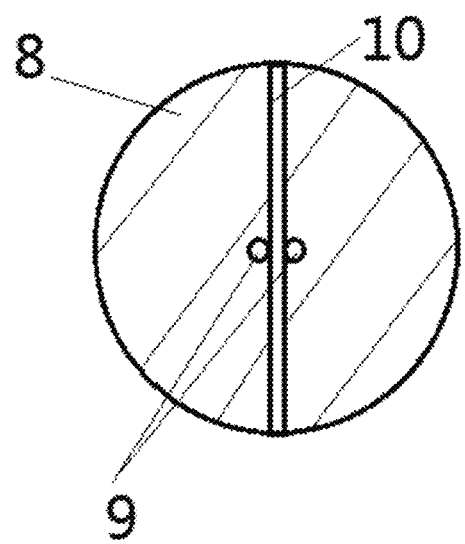
FIG. 5 is a lateral sectional view of the temperature probe in the system for continuously detecting the temperature and composition of molten steel during converter steelmaking according to the present disclosure.
Figure 6:
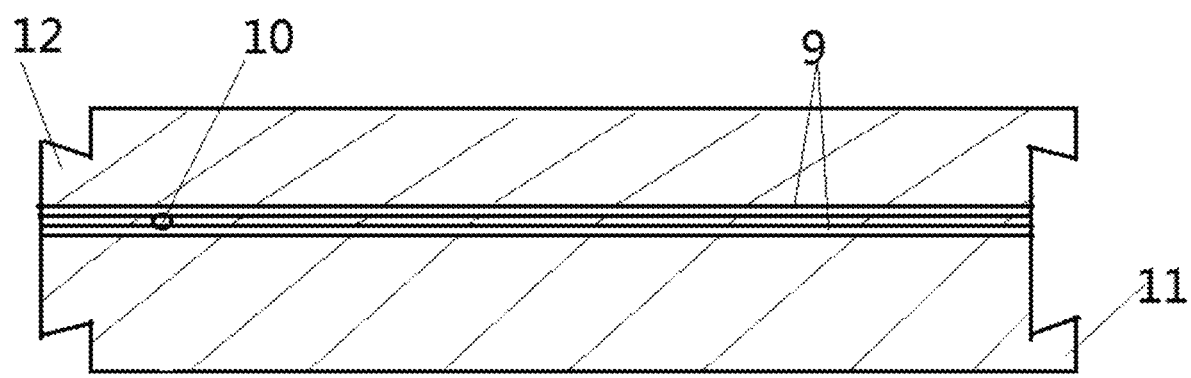
FIG. 6 is a sectional view of the temperature probe in the system for continuously detecting the temperature and composition of molten steel during converter steelmaking according to the present disclosure.
Figure 7:
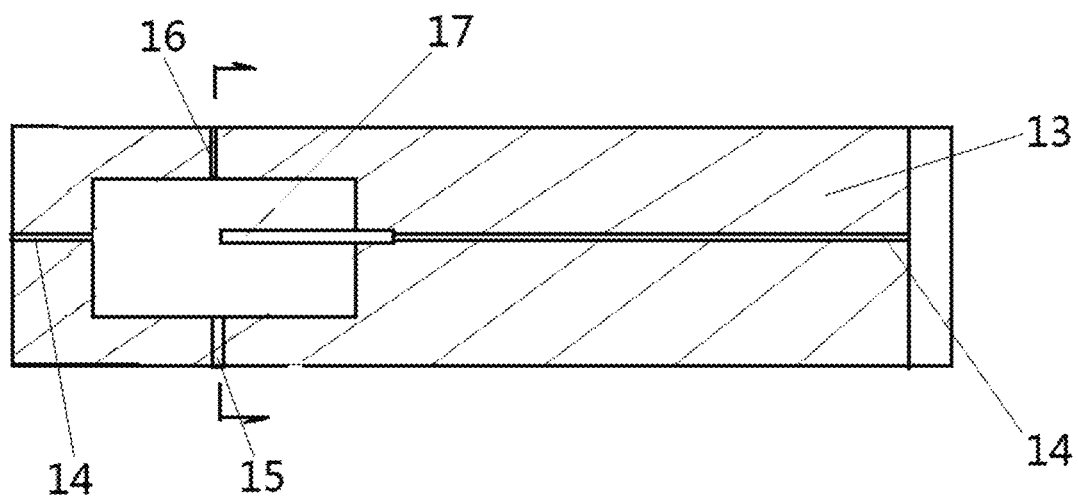
FIG. 7 is a structural diagram of a carbon probe in the system for continuously detecting the temperature and composition of molten steel during converter steelmaking according to the present disclosure.
Figure 8:
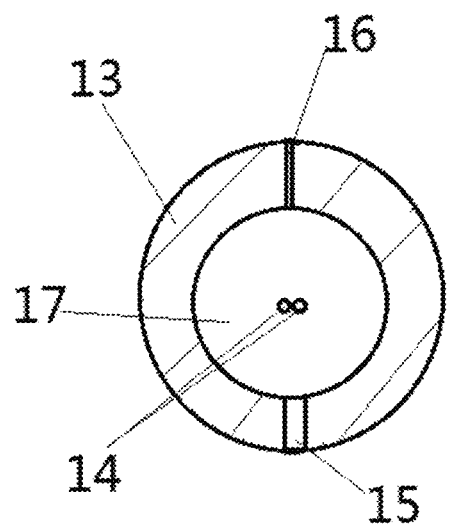
FIG. 8 is a lateral sectional view of the carbon probe in the system for continuously detecting the temperature and composition of molten steel during converter steelmaking according to the present disclosure.
Figure 9:
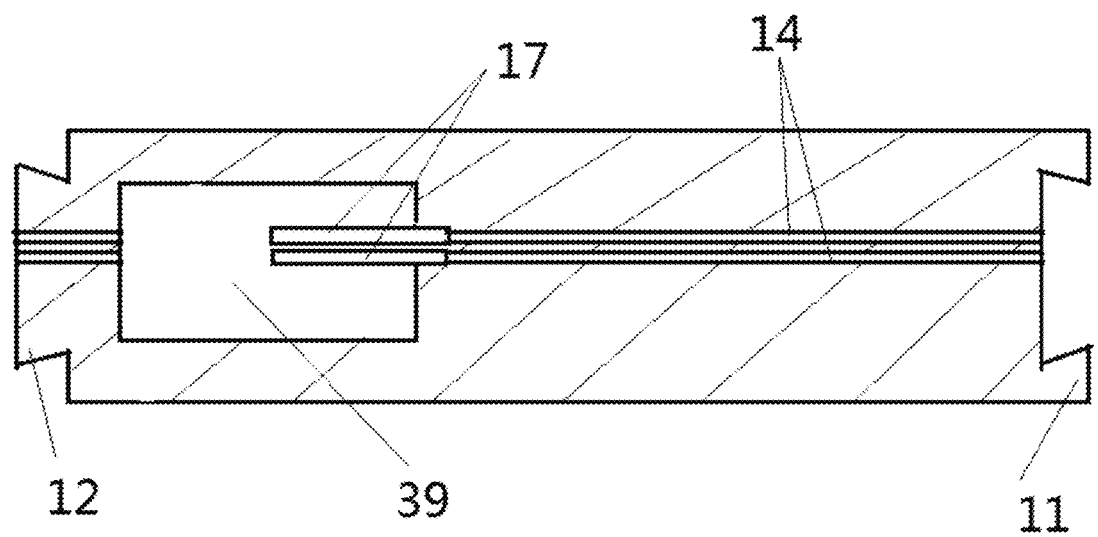
FIG. 9 is a sectional view of the carbon probe in the system for continuously detecting the temperature and composition of molten steel during converter steelmaking according to the present disclosure.
Figure 10:
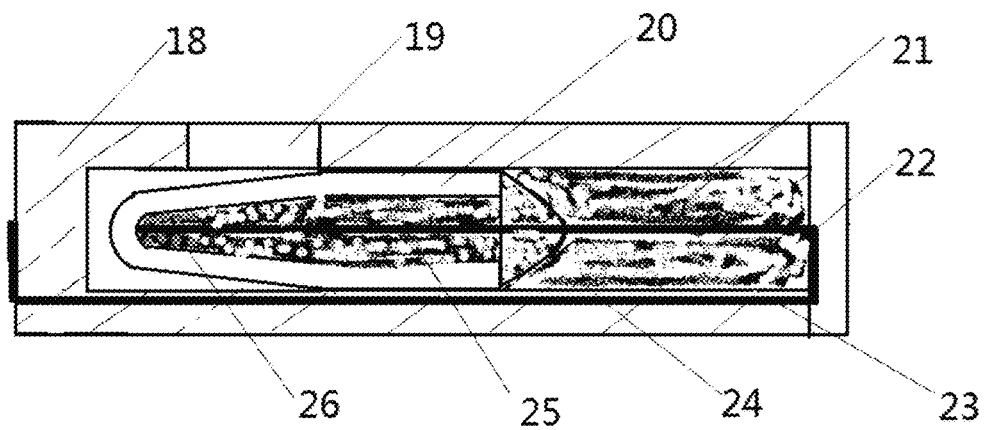
FIG. 10 is a structural diagram of an oxygen probe in the system for continuously detecting the temperature and composition of molten steel during converter steelmaking according to the present disclosure.
Figure 11:
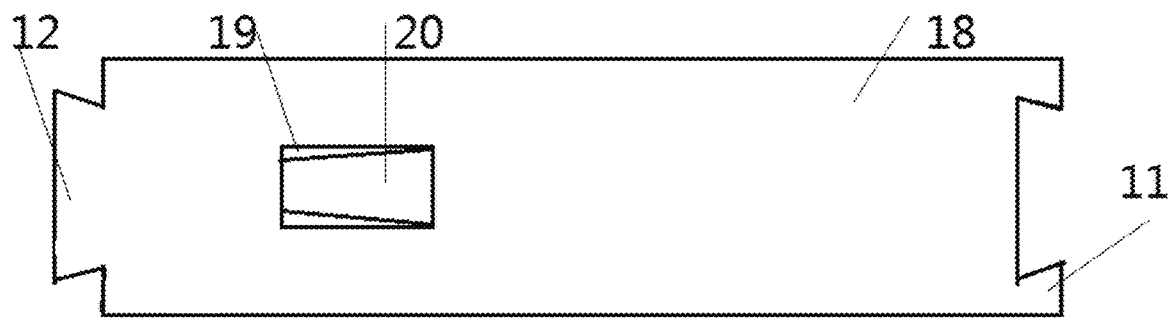
FIG. 11 is a top view of the oxygen probe in the system for continuously detecting the temperature and composition of molten steel during converter steelmaking according to the present disclosure.
Figure 12:
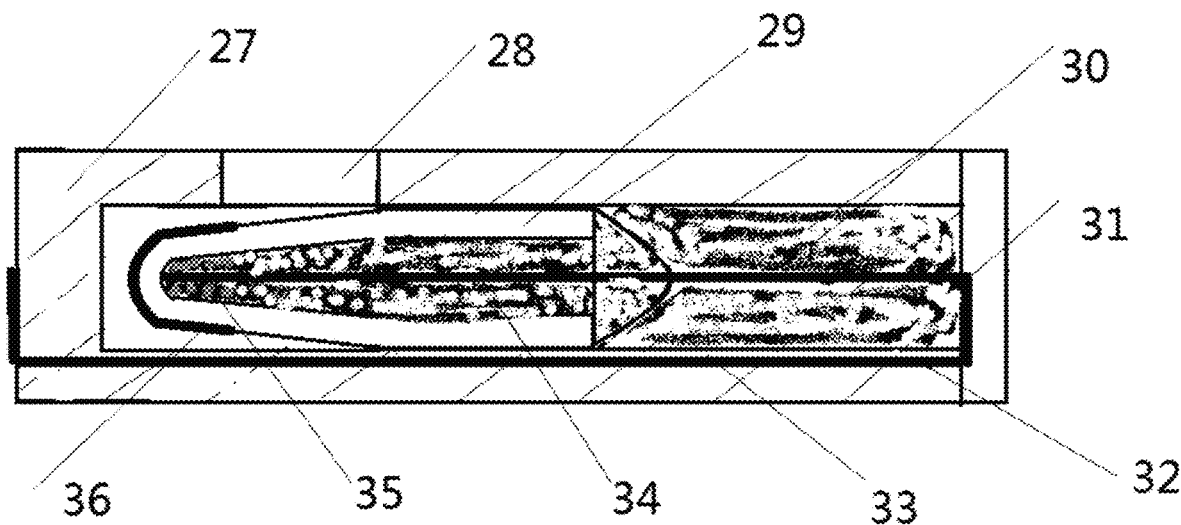
FIG. 12 is a structural diagram of a phosphorus probe in the system for continuously detecting the temperature and composition of molten steel during converter steelmaking according to the present disclosure.
Figure 13:
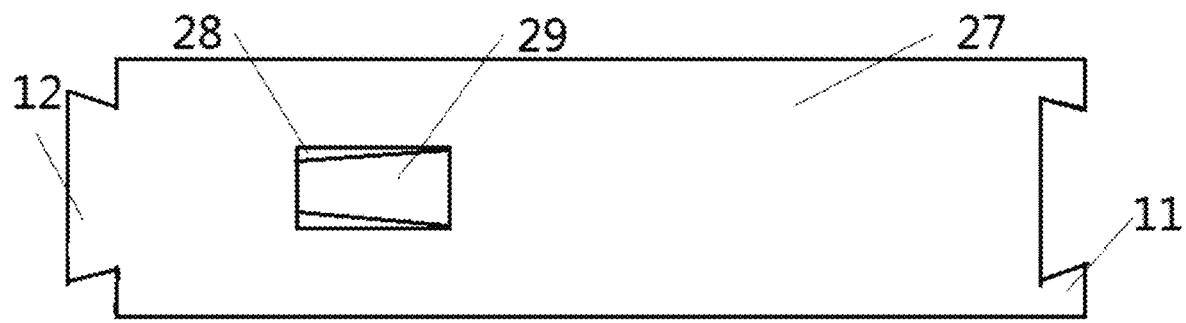
FIG. 13 is a top view of the phosphorus probe in the system for continuously detecting the temperature and composition of molten steel during converter steelmaking according to the present disclosure.
Figure 14:
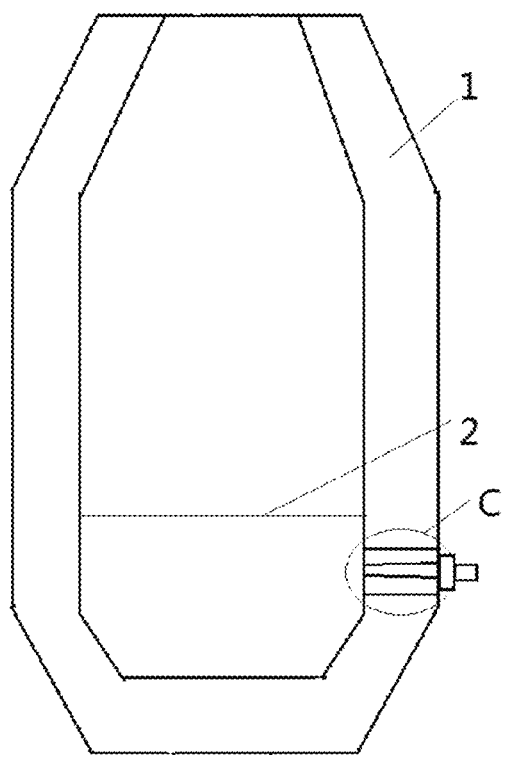
FIG. 14 is a structural diagram of another implementation of the system for continuously detecting the temperature and composition of molten steel during converter steelmaking according to the present disclosure.
Figure 15:
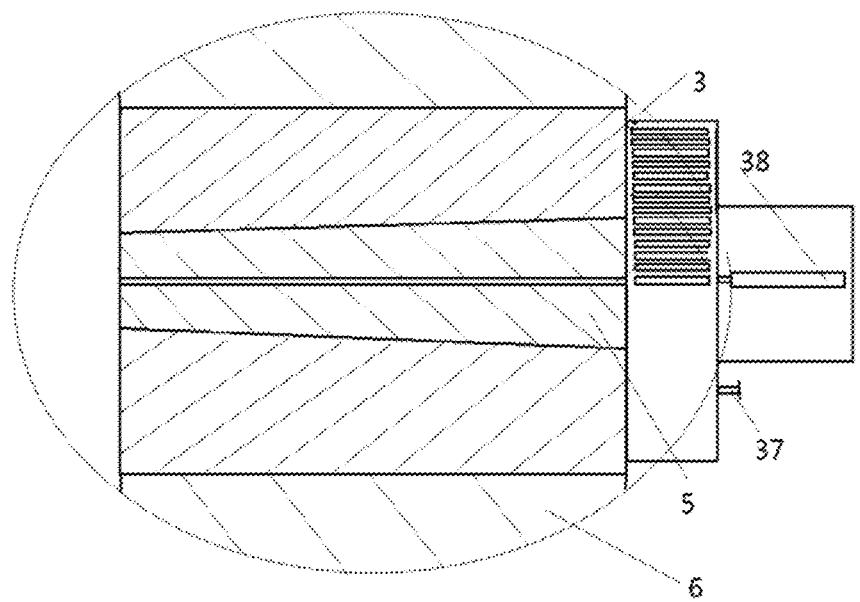
FIG. 15 is a detail drawing of C of the system for continuously detecting the temperature and composition of molten steel during converter steelmaking according to the present disclosure.

Reference Numerals: 1. converter; 2. static level of molten steel; 3. seating brick; 4. detection through hole; 5. probe conveying pipe; 6. converter lining; 7. detection probe; 8. temperature detection shell; 9. small through hole; 10. large through hole; 11. concave wedge; 12. convex wedge; 13. carbon determination shell; 14. carbon determination through hole; 15. inlet hole; 16. outlet hole; 17. thermocouple fixing tube; 18. oxygen detection shell; 19. oxygen detection window; 20. oxygen detection half-cell zirconia tube; 21. oxygen detection refractory castable; 22. oxygen detection molybdenum needle; 23. oxygen detection wire; 24. sealing refractory material; 25. oxygen detection filling material; 26. oxygen detection half-cell reference electrode; 27. phosphorus detection shell; 28. phosphorus detection window; 29. phosphorus detection half-cell zirconia tube; 30. phosphorus detection refractory castable; 31. phosphorus detection molybdenum needle; 32. phosphorus detection wire; 33. phosphorus detection sealing refractory material; 34. phosphorus detection filling material; 35. phosphorus detection half-cell reference electrode; 36. auxiliary electrode; 37. argon blowing system; 38. hydraulic ejector rod; and 39. carbon determination carbon determination crystallization chamber.

DETAILED DESCRIPTION

The technical solutions in the embodiments of the present disclosure are clearly and completely described below with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts should fall within the protection scope of the present disclosure.

Embodiment 1

This embodiment provides a system for continuously detecting the temperature and composition of molten steel during converter steelmaking. As shown in FIG. 1, the detection system includes a seating brick 3, a probe conveying pipe 5 and detection probes 7. The seating brick 3 is provided on a side wall of a converter 1. A mounting hole is provided in the middle of the seating brick 3, and a side of the mounting hole facing the converter 1 has a smaller diameter. The probe conveying pipe 5 is provided in the mounting hole. The probe conveying pipe 5 is provided therein with multiple detection through holes 4. The number of the detection through holes 4 is determined according to different detection projects, and generally may be three to five. In this embodiment, there are four detection through holes 4. The detection probes 7 include temperature probes, carbon probes, oxygen probes and phosphorus probes. A type of detection probes 7 are provided in each detection through hole 4.

In this specific embodiment, as shown in FIGS. 1 to 15, both the seating brick 3 and the probe conveying pipe 5 are made of a refractory material, and a refractory material is used to fill and seal a space between the seating brick 3 and the probe conveying pipe 5.

In this specific embodiment, the seating brick 3 is located 800 mm below a static liquid level 2 of molten steel in the converter 1.

One end of the detection probe 7 is provided with a convex wedge 12, and the other end thereof is provided with a concave wedge 11. The convex wedge 12 matches the concave wedge 11.

Multiple detection probes 7 may be provided in each detection through hole 4. In this embodiment, six detection probes 7 are provided in each detection through hole 4. The detection probes 7 are connected by the convex wedge 12 and the concave wedge 11.

A pushing mechanism is used to push the detection probe 7 into the converter 1 along the detection through hole 4. The pushing mechanism is a hydraulic cylinder.

A gas protection mechanism is further provided on a side of the probe conveying pipe 5 located outside the converter 1. The gas protection mechanism is used to feed a protective gas into the detection through hole 4 to prevent the molten steel from flowing out along the detection through hole 4.

In a more specific embodiment, the gas protection mechanism may include a sealing cover provided on an outer side of the seating brick 3. A gas interface is provided on the sealing cover. High-pressure argon is introduced into the sealing cover through a gas cylinder or a gas supply system to fill a gap between the detection probe 7 and the detection through hole 4 to prevent the molten steel from flowing out.

The temperature probe includes a cylindrical temperature detection shell 8. Two small through holes 9 are provided in the temperature detection shell 8 along an axial direction. A large through hole 10 is provided perpendicular to the two small through holes 9. The large through hole 10 is in communication with the two small through holes 9. A thermocouple wire is passed through the two small through holes 9 respectively. The large through hole 10 is used to introduce the molten steel. The thermocouple wire is a tungsten-rhenium thermocouple wire for temperature detection. The thermocouple wire runs through a plurality of temperature probes arranged in series to transmit the detection data of the temperature probes in the molten steel. When the temperature probes are in the molten steel, the molten steel flows into the large through hole 10 to connect two thermocouple wires, so that an electrical path is formed between the two thermocouple wires, and the thermocouple wires detect and transmit the detection data.

The carbon probe includes a cylindrical carbon determination shell 13. The carbon determination shell 13 is provided therein with a carbon determination crystallization chamber 39, two carbon determination through holes 14, an inlet hole 15 and an outlet hole 16. The two carbon determination through holes 14 penetrate the carbon determination shell 13 and communicate with the carbon determination crystallization chamber 39. The inlet hole 15 is provided at the bottom of the carbon determination crystallization chamber 39, and the outlet hole 16 is provided at the top of the carbon determination crystallization chamber 39. The carbon determination crystallization chamber 39 is further provided therein with two fixing tubes. One end of each fixing tube respectively communicates with one of the carbon determination through holes 14. A platinum-rhodium thermocouple wire is passed through the carbon determination through hole 14. The platinum-rhodium thermocouple wire runs through a plurality of carbon probes arranged in series to transmit the detection data of the carbon probes in the molten steel. When the carbon probes are in the molten steel, the molten steel flows into the carbon determination crystallization chamber 39 from the inlet hole 15, and the gas in the carbon determination crystallization chamber 39 is discharged from the outlet hole 16. The molten steel connects two platinum-rhodium thermocouple wires, so that an electrical path is formed between the two platinum-rhodium thermocouple wires, and the platinum-rhodium thermocouple wires detect and transmit detection data.

The oxygen probe includes an oxygen detection shell 18. The oxygen detection shell 18 is cylindrical. A first chamber is provided at the inner bottom of the oxygen detection shell 18. The first chamber is provided with an oxygen detection window 19 connected to the outside. An oxygen detection half-cell zirconia tube 20 is provided in the first chamber. A side of the oxygen detection half-cell zirconia tube 20 away from the oxygen detection window 19 is provided with an open end. A sealing refractory material 24 is provided outside the open end. A refractory castable is provided between the sealing refractory material 24 and the oxygen detection shell 18. The oxygen detection half-cell zirconia tube 20 is provided therein with a filling material, which is aluminum oxide. An oxygen detection half-cell reference electrode 26 is provided between the filling material and the oxygen detection half-cell zirconia tube 20. The oxygen probe further includes an oxygen detection molybdenum needle 22 that penetrates the filling material, the sealing refractory material 24 and the refractory castable and extends out of the oxygen detection shell 18. The oxygen detection molybdenum needle 22 is connected to one end of an oxygen detection wire 23, and the other end of the oxygen detection wire 23 is provided at the outer bottom of the oxygen detection shell 18. The oxygen detection wire 23 is a stainless steel wire. The oxygen detection wire 23 transmits the detection data of the oxygen detection molybdenum needle 22 to the oxygen detection wire 23 of an adjacent oxygen probe, thereby transmitting the detection result.

The phosphorus probe includes a phosphorus detection shell 27. The phosphorus detection shell 27 is cylindrical. A second chamber is provided at the inner bottom of the phosphorus detection shell 27. The second chamber is provided with a phosphorus detection window 28 connected to the outside. A phosphorus detection half-cell zirconia tube 29 is provided in the second chamber. A side of the phosphorus detection half-cell zirconia tube 29 away from the phosphorus detection window 28 is provided with an open end. An auxiliary electrode 36 is provided at one end of the phosphorus detection half-cell zirconia tube 29 close to the phosphorus detection window 28. The auxiliary electrode 36 is a zirconium phosphate sintered layer. A phosphorus detection sealing refractory material 33 is provided outside the open end. A refractory castable is provided between the phosphorus detection sealing refractory material 33 and the phosphorus detection shell 27. A filling material is provided in the phosphorus detection half-cell zirconia tube 29. The filling material is aluminum oxide. A phosphorus detection half-cell reference electrode 35 is provided between the filling material and the phosphorus detection half-cell zirconia tube 29. The phosphorus probe further includes a phosphorus-molybdenum detection needle 31 that penetrates the filling material, the phosphorus detection sealing refractory material 33 and the refractory castable and extends out of the oxygen detection shell 18. The phosphorus-molybdenum detection needle 31 is connected to one end of a phosphorus detection wire 32, and the other end of the phosphorus detection wire 32 is provided at the outer bottom of the phosphorus detection shell 27. The phosphorus detection wire 32 is a stainless steel wire. The phosphorus detection wire 32 transmits the detection data of the phosphorus detection molybdenum needle 31 to the phosphorus detection wire 32 of an adjacent phosphorus probe, thereby transmitting the detection result.

The temperature detection shell 8, the carbon determination shell 13, the oxygen detection shell 18 and the phosphorus detection shell 27 are all made of a zirconia material.

After the molten iron is mixed in the converter 1, a lance is dropped for blowing, and a charge is melted, an operator can click on a temperature detection button on an instrument interface, and the pushing mechanism will push the temperature probe to a detection position of the molten steel to perform continuous temperature detection. The detection probe 7 will remain in this position, and be discarded until the next temperature probe arranged behind is completely pushed into the molten steel.

Two adjacent detection probes 7 are connected by the concave wedge 11 and the convex wedge 12. After a detection probe 7 is completely pushed into the molten steel, it is agitated by the molten steel, and the convex wedge 12 is separated from the concave wedge 11, causing the detection probe 7 to fall into the molten steel.

The operator of the converter 1 can click a continuous oxygen detection button on the instrument interface in the middle and late stages of the blowing process according to the operation needs. The continuous oxygen detection probe provides continuous oxygen detection data until the steel is tapped. Through a calculation formula set in the instrument, continuous molten steel carbon data are provided for the operator according to the temperature and oxygen activity of the molten steel.

Similarly, the operator can click a continuous phosphorus detection button, and the pushing mechanism will push the continuous phosphorus detection probe to the detection position of the molten steel to acquire the phosphorus content data of the entire blowing process for the operator.

If the operator needs to use the method of crystallized carbon determination to detect medium and high carbon, the operator can click a crystallized carbon determination key. The pushing mechanism will push the carbon probe to perform crystallized carbon determination, and provide the medium and high carbon data of crystallized carbon determination to the operator.

Specific embodiments are used in the specification for illustration of the principles and implementations of the present disclosure. The description of the embodiments is used to help understand the method and its core principles of the present disclosure. Meanwhile, those skilled in the art can make various modifications to the specific implementations and scope of application in accordance with the teachings of the present disclosure. In conclusion, the content of this specification should not be construed as a limitation to the present disclosure.

What is claimed is:

1. A system for continuously detecting the temperature and composition of molten steel during converter steelmaking, comprising a seating brick, a probe conveying pipe, detection probes and a pushing mechanism, wherein the seating brick is provided on a side wall of a converter; a mounting hole is provided in the middle of the seating brick; the probe conveying pipe is provided in the mounting hole; the probe conveying pipe is provided therein with a detection through holes; each of the detection probes is provided in a corresponding one of the detection through holes; and the pushing mechanism is for pushing each of the detection probes into the converter along the corresponding one of the detection through holes.

2. The system for continuously detecting the temperature and composition of molten steel during converter steelmaking according to claim 1, wherein both the seating brick and the probe conveying pipe are made of a refractory material.

3. The system for continuously detecting the temperature and composition of molten steel during converter steelmaking according to claim 1, wherein the seating brick is located 200 mm to 1,000 mm below a static liquid level of molten steel in the converter.

4. The system for continuously detecting the temperature and composition of molten steel during converter steelmaking according to claim 1, wherein one end of each of the detection probes is provided with a convex wedge, and an other end of the each of the detection probes is provided with a concave wedge; and the convex wedge matches the concave wedge.

5. The system for continuously detecting the temperature and composition of molten steel during converter steelmaking according to claim 1, wherein the pushing mechanism is an air cylinder or a hydraulic cylinder.

6. The system for continuously detecting the temperature and composition of molten steel during converter steelmaking according to claim 1, wherein a gas protection mechanism is further provided on a side of the probe conveying pipe located outside of the converter; and the gas protection mechanism is used to feed a protective gas into the detection through holes to prevent the molten steel from flowing out along the detection through holes.

7. The system for continuously detecting the temperature and composition of molten steel during converter steelmaking according to claim 1, wherein the detection probes comprise a temperature probe, a carbon probe, an oxygen probe and a phosphorus probe.

* * * * *